United States Patent
Gupta

(10) Patent No.: US 10,997,119 B2
(45) Date of Patent: May 4, 2021

(54) REDUCED SIZE EXTENT IDENTIFICATION

(71) Applicant: Nutanix, Inc., San Jose, CA (US)

(72) Inventor: Karan Gupta, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 563 days.

(21) Appl. No.: 14/921,974

(22) Filed: Oct. 23, 2015

(65) Prior Publication Data

US 2020/0034449 A1 Jan. 30, 2020

(51) Int. Cl.
*G06F 16/13* (2019.01)
*G06F 16/11* (2019.01)
*G06F 16/174* (2019.01)

(52) U.S. Cl.
CPC .......... *G06F 16/137* (2019.01); *G06F 16/122* (2019.01); *G06F 16/1748* (2019.01)

(58) Field of Classification Search
CPC .................................................... G06F 16/137
See application file for complete search history.

(56) References Cited

U.S. PATENT DOCUMENTS

| | | | | |
|---|---|---|---|---|
| 5,021,946 A * | 6/1991 | Korty | ................... | G06F 16/9017 |
| 6,912,630 B1 * | 6/2005 | Pillai | ................... | G06F 11/1451 |
| | | | | 707/999.202 |
| 7,921,176 B2 * | 4/2011 | Madnani | ................. | H04L 51/12 |
| | | | | 709/207 |
| 8,234,430 B2 * | 7/2012 | Zipperer | ............... | G06F 9/4812 |
| | | | | 710/260 |
| 8,549,518 B1 | 10/2013 | Aron et al. | | |
| 8,601,473 B1 | 12/2013 | Aron et al. | | |
| 8,850,130 B1 | 9/2014 | Aron et al. | | |
| 9,009,106 B1 * | 4/2015 | Aron | ....................... | G06F 16/00 |
| | | | | 707/610 |
| 9,772,866 B1 | 9/2017 | Aron et al. | | |
| 2007/0043743 A1 * | 2/2007 | Chen | ....................... | G06F 16/81 |
| 2008/0162651 A1 * | 7/2008 | Madnani | ............. | G06Q 10/107 |
| | | | | 709/206 |
| 2010/0191979 A1 * | 7/2010 | Zipperer | ............... | G06F 9/4812 |
| | | | | 713/189 |
| 2014/0114934 A1 * | 4/2014 | Chakraborty | ......... | G06F 3/0608 |
| | | | | 707/692 |
| 2015/0058529 A1 * | 2/2015 | Lin | ....................... | G06F 3/0679 |
| | | | | 711/103 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Eliyah S. Harper
(74) *Attorney, Agent, or Firm* — Vista IP Law Group, LLP

(57) ABSTRACT

An approach for reduced size extent identifiers for a file system may be implemented by generating a full-size extent or file identifier and generating a smaller identifier from a portion of the full-size identifier. A check may be performed as to whether the smaller identifier is unique within a file system and if it is unique, the smaller identifier may be used in place of the full-size identifier. If not unique, the size of the smaller identifier may be increased. In some embodiments, the size of the smaller identifier is increased until a unique identifier if found.

24 Claims, 17 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

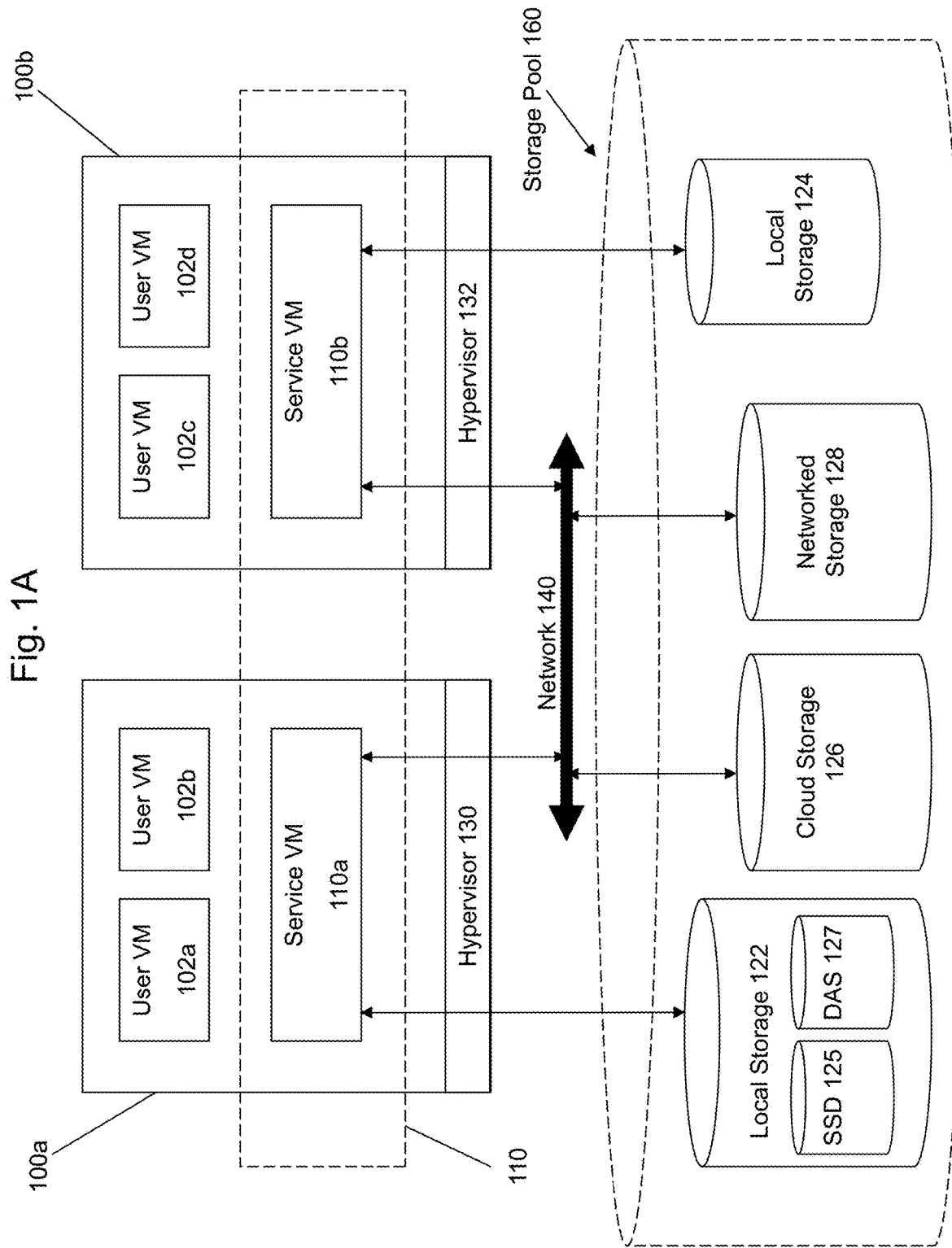

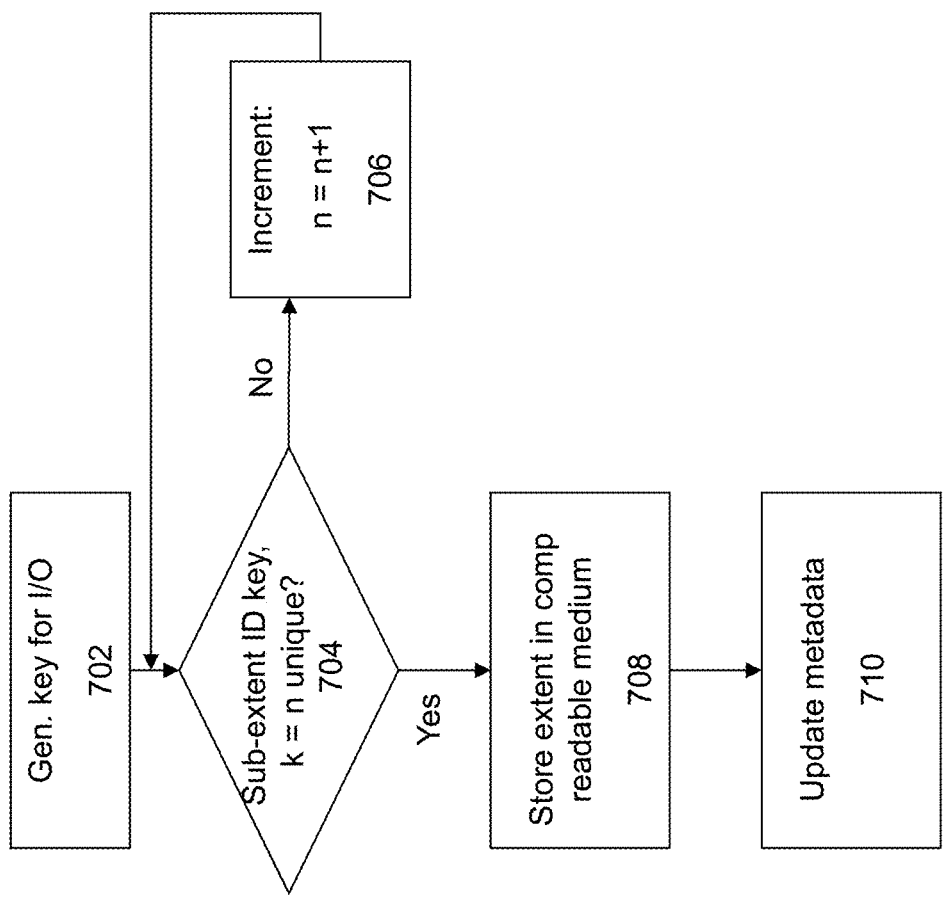

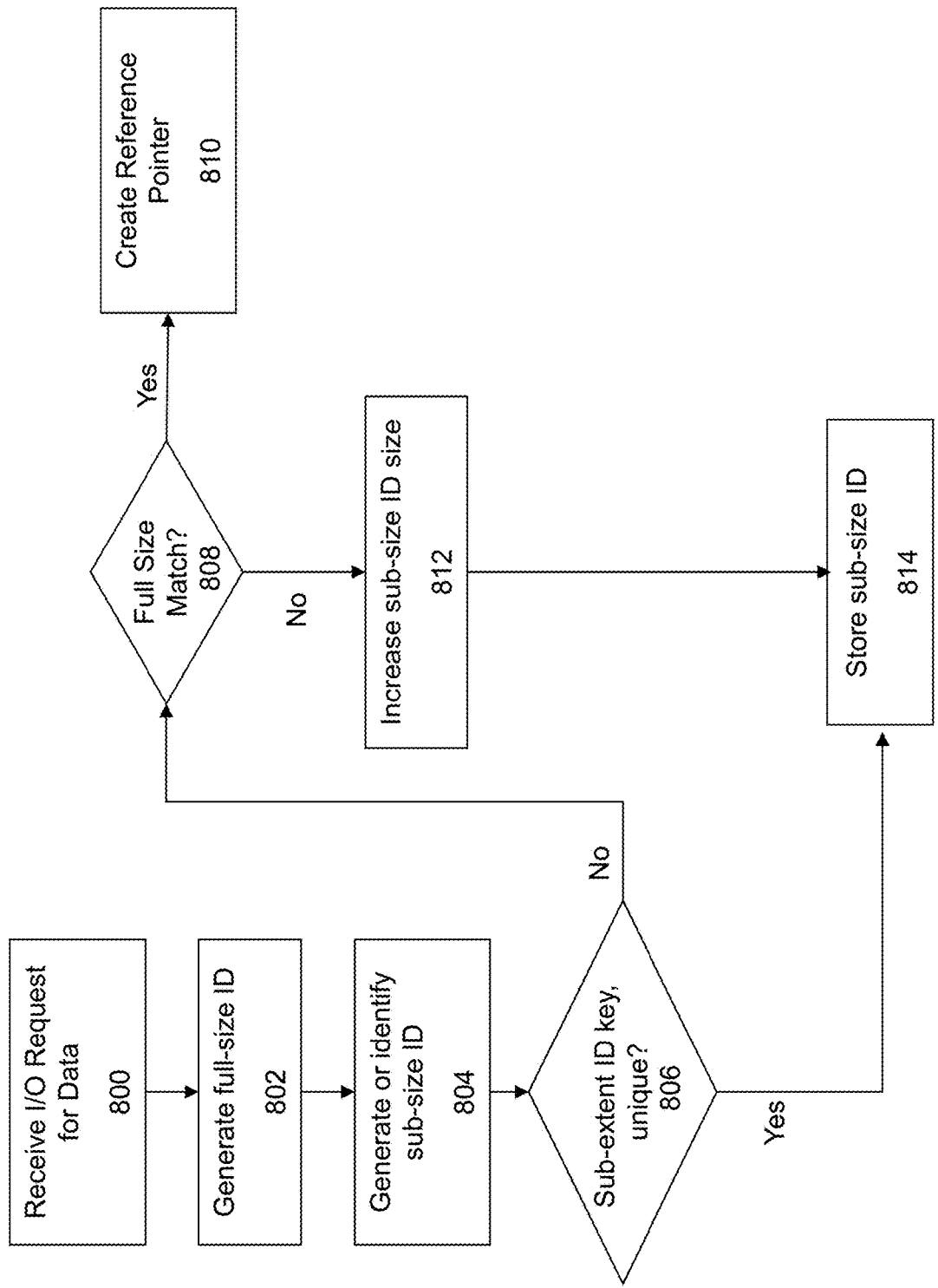

REDUCED SIZE EXTENT IDENTIFICATION

BACKGROUND

In some computing environments, files are identified using a key or identifier created by an algorithm, such as a hash function (e.g., SHA-1). The key may be created in such a way to ensure that is unique within a file system. In this way, file system can use the keys that uniquely identify files to manage and/or organize files within a given file system.

The file keys are typically smaller in size than the respective files that they identify. However, in large file systems, such as in enterprise networks, the cumulative size of just the file keys can require large expensive storage capacities to store the keys and powerful computational resources to manage the keys and/or file system. Similar problems may arise in networks where backups or node cluster based replication is enabled. For example, in a NoSQL (e.g., Cassandra) cluster having many nodes, each node may be required to locally store the file keys managed by the cluster. Further, a single file that is identified by an individual file key may have to be replicated to each node in the cluster, thereby multiplying the required storage capacity to store and manage the file keys.

As the amount of information managed by the file system increases, the amount of storage and computational resources necessary to store and track all of the file keys incurs substantial overhead. As is evident, there is a demand for new approaches efficiently manage file systems using keys.

SUMMARY

In some embodiments, reduced size extent identification may be implemented by generating a full-size extent identifier (ID) for an extent or file to be stored, and then generating a smaller identifier or sub-size extent identifier (ID) from a portion of the full-size identifier. In some embodiments, there may be a check as to whether the sub-size extent identifier is unique within a file system and if it is unique, the sub-size extent ID may be used in place of the full-size extent ID to identify the extent or file to be stored within the file system. In some embodiments, if the sub-size extent ID is not unique, the size of the sub-size extent ID may be increased. In some embodiments, the size of the sub-size extent ID is increased until a unique identifier is found.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 1A-C illustrate virtualization network architectures that may be implemented for using reduced size extent identification, as according to some embodiments.

FIG. 7A illustrates a flowchart for an approach using sub-size extent IDs, according to some embodiments.

FIG. 8A illustrates a flowchart for an approach for matching sub-size extent IDs involving deduplication, according to some embodiments.

DETAILED DESCRIPTION

Figure 1B:
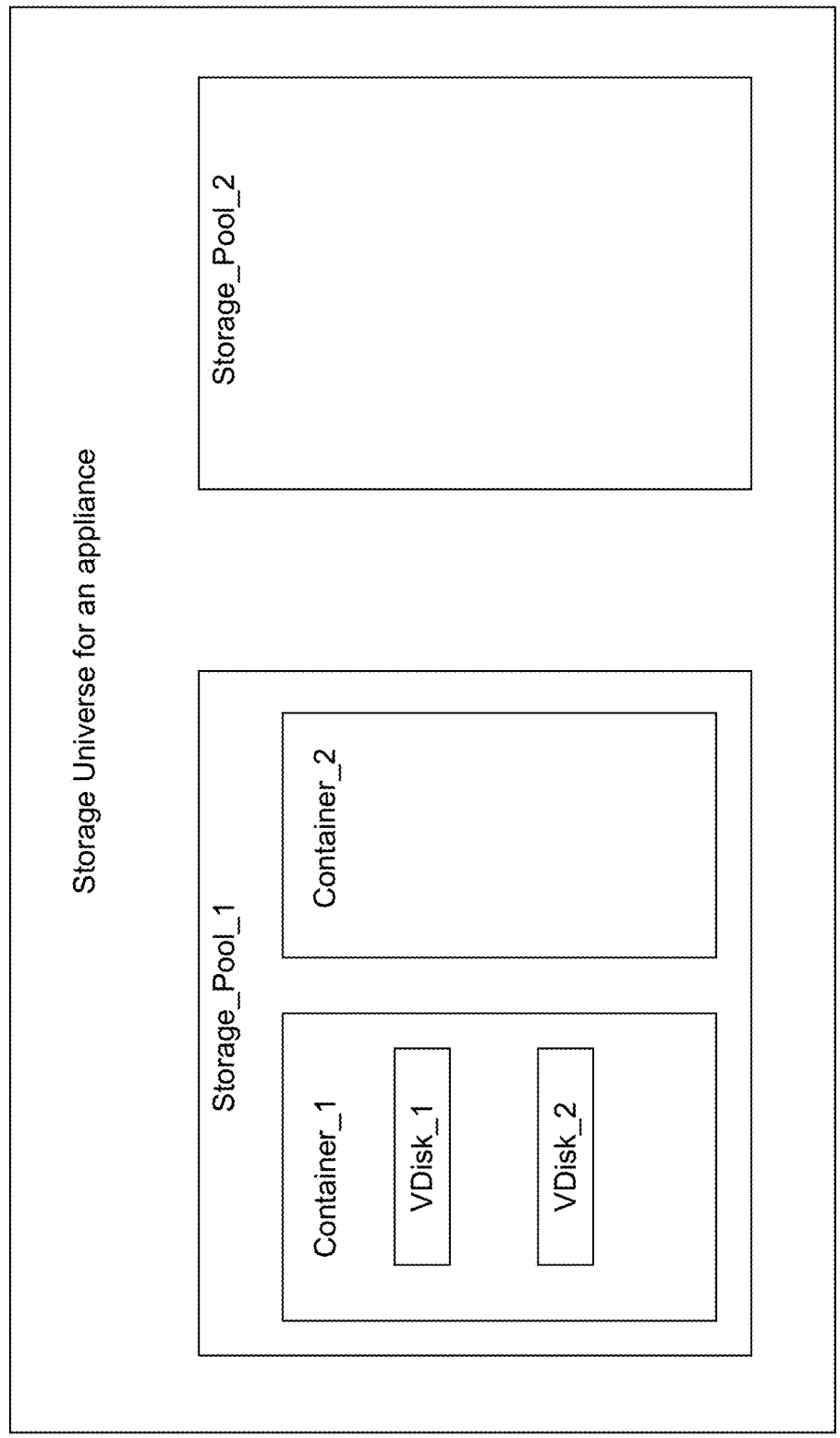

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding. In some embodiments, reduced size extent identification may be implemented by generating a full-size extent identifier (ID) for an extent or file to be stored, and then generating a smaller identifier or sub-size extent identifier (ID) from a portion of the full-size identifier. For example, a full-size extent ID of 20-bytes may be generated applying SHA1 to the extent and a sub-size extent ID may be generated by assigning the first several (e.g., first four bytes) of the full-size extent ID as the sub-size extent ID. Generally, the full-size extent identifier is generated in such a way to ensure uniqueness within a file system (using hash functions or other ID generation mechanisms). In some embodiments, there may be a check as to whether the sub-size extent identifier is unique within a file system and if it is unique, the sub-size extent ID may be used in place of the full-size extent ID to identify the extent or file to be stored.

However, if the sub-size extent is not unique, the size of the sub-size extent ID may be increased. In some embodiments, the size of the sub-size extent ID is increased until it is unique in the file system. In some embodiments, the full-size extent identifier is still stored to serve as a reference for later similarities comparisons (to resolve the possible collisions or matches between two sub-size extent IDs).

Also, in some embodiments, a mapping file may be maintained to map sub-size IDs to full-size IDs. The mapping file can be used to resolve conflicts and matching issues. The mapping structure may store a complete set of the full-size extent IDs and corresponding implemented sub-size extent IDs. In some embodiments, the mapping corresponds to a table having a file-size extent ID column or portion and a corresponding sub-size extent ID column to show which sub-size ID is being used for which full-size ID (e.g., a single row of the table for an extent, shows the row/column intersections to show the correspondence between small and large IDs). In some embodiments, the mapping structure can be used for deduplication purposes to find full-keys and create references to appropriate sub-size keys throughout one or more metadata layers. Though a table is discussed above as an example data structure for storing and associating the full-size extent IDs with the sub-size extent IDs, one of ordinary skill in the art appreciates that types of data structures and/or database types may be equally implemented to track and manage full-size and sub-size extent IDs.

FIG. 1A illustrates an architecture for implementing storage management in a virtualization environment that can use reduced size IDs for extents, as according to some embodiments of the invention. The architecture of FIG. 1A can be implemented for a distributed platform that contains multiple servers 100a and 100b that manages multiple-tiers of storage. Like some previous approaches, the multiple tiers of storage include storage that is accessible through a network 140, such as cloud storage 126 or networked storage 128 (e.g., a SAN or "storage area network"). However, unlike previous approaches, the present embodiment also permits management of local storage 122/124 that is within or directly attached to the server and/or appliance. Examples of such storage include SSDs 125 ("Solid State Drives") or HDDs ("hard disk drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction or virtual storage unit that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as the ESX product available from VMWare. The virtualization software includes a hypervisor 130/132 to manage the interactions between the underlying hardware and the one or more user VMs 102a, 102b, 102c, and 102d that run client software. Although in FIG. 1A the virtualized computers are illustrated as virtual machines (e.g., software implemented computer constructs, which may include a guest OS and other virtualized components), one of ordinary skill in the art appreciates that the approaches described herein can be implemented with other types of computing devices, physical or virtual. Such virtual alternatives may include, for example, Linux Container technologies (e.g., LXC, Docker).

As illustrated in FIG. 1A, a special VM 110a/110b is used to manage storage and I/O activities according to some embodiments, which is referred to herein as a "Service VM". The Service VMs 110a/110b are not formed as part of specific implementations of hypervisors 130/132. Instead, the Service VMs run as virtual machines above the hypervisors 130/132 on the various servers 100a and 100b, and work together to form a distributed virtualized storage controller system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs or other virtual computers can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the illustrated present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

According to some embodiments, the service VM runs the Linux operating system. The service VM exports virtual disks to the user VMs. For easy management of the appliance, the storage is divided up into abstractions that have a hierarchical relationship to each other. FIG. 1B illustrates the storage hierarchy of the storage objects according to some embodiments of the invention, where all storage in the storage appliance collectively forms a Storage Universe or global pool that is addressable using the same address space. The metadata and addressing scheme thus implements a global address space that addresses storage across the multiple types of storage devices seamlessly. These storage devices may encompass any suitable devices, such as server-local SSDs or HDDs, network-attached SAN or Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make just one storage pool with all the disks in the storage universe in that pool. However, the principal idea behind dividing up the storage universe is to provide mutual exclusion when accessing the disk resources.

This may be one approach that can be taken to implement QoS techniques. For example, one rogue user may result in lots of random IO activity on a hard disk—thus if other users are doing sequential IO, they still might get hurt by the rogue user. Enforcing exclusion through storage pools might be used to provide hard guarantees for premium users. Another reason to use a storage pool might be to reserve some disks for later use.

In some embodiments, the container abstraction specifies a deduplication domain. That is, all deduplication is done for data stored within a container. Data in different containers is not deduplicated even if it is the same. A container is assigned one or more storage pools—this defines the disks where the data for that container will be stored. A container supports several configuration parameters that determine how the data on that container is treated. For some configuration parameters may include some or all of the following features or parameters.

(1) Replication factor: Data in a container is replicated based on this replication factor. Replicas are placed on different servers whenever possible.

(2) Reed Solomon parameters: While all data is written initially based on the specified replication factor, it may be converted later to use Reed Solomon encoding to further save on storage capacity. The data contraction policy on the vDisks enforces when the data is converted to use Reed Solomon encoding.

(3) Encryption type: Data in a container is encrypted based on the specified encryption policy if any. It is noted that there are also other encoding schemes which can be utilized as well.

(4) Compression type: Data in a container is compressed based on the given compression type. However, when to compress is a policy that's specified on individual vDisks assigned to a container. That is, compression may be done inline, or it may be done offline.

(5) Max capacity: This parameter specifies the max total disk capacity to be used in each tier in the assigned storage pools.

(6) Min reserved capacity (specified for each tier): This parameter can also be specified for each tier in the assigned storage pools. It reserves a certain amount of disk space on each tier for this container. This ensures that that disk space would be available for use for this container irrespective of the usage by other containers.

(7) Min total reserved capacity: This is the minimum reserved across all tiers. This value should be greater than or equal to the sum of the min reserved capacity per tier values.

(8) Max de-duplication extent size: The Rabin fingerprinting algorithm breaks up a contiguous space of data into variable sized extents for the purpose of de-duplication. This parameter determines the max size of such extents.

(9) Stripe width: To get high disk bandwidth, it is important to stripe data over several disks. The stripe width dictates the number of extents corresponding to a contiguous vDisk address space that'll be put in a single extent group.

(10) Tier ordering: All tiers in the assigned storage pools are ordered relative to each other. Hot data is placed in the tier highest up in the order and migrated to other tiers later based on the ILM ("Information Lifecycle Management" or data water-falling) policy. A different tier ordering may be specified for random IO as opposed to sequential IO. Thus, one may want to migrate data to the SSD tier only for random IO and not for sequential IO.

(11) ILM policy: The ILM policy dictates when data is migrated from one tier to the tier next in the tier ordering. For example, this migration may start when a given tier is more than 90% full or when the data on that tier is more than X days old.

vDisks are the virtual disks that are exported to user VMs by the Service VMs. A vDisk is a software abstraction that manages an address space of S bytes where S is the size of the block device. Each service VM might export multiple vDisks. A user VM might access several vDisks. Typically, all the vDisks exported by a service VM are accessed only by the user VMs running on that server node. A vDisk is assigned a unique container at creation time. The data in the vDisk is thus managed according to the configuration parameters set on the container. Some additional configuration parameters are specified on the vDisk itself, including some or all of the following:

(1) Deduplication: This specifies whether deduplication is to be used for this vDisk. However, when deduplication is used is determined by the data contraction policy.

(2) Data contraction policy: The data contraction policy controls when deduplication, compression, and Reed-Solomon encoding is applied (if any of them are specified). Deduplication and compression may be applied in-line to a primary storage path or out-of-line. If out-of-line, the data contraction policy specifies the time when deduplication/compression are applied (e.g., X days). Reed-Solomon encoding should be applied offline. The data contraction policy may specify a different time for doing Reed-Solomon than for deduplication/compression. Note that if both deduplication and compression are specified, then data would be de-duplicated and compressed at the same time before writing to disk.

(3) Min total reserved capacity: This is the minimum reserved capacity for this vDisk across all the storage tiers. The sum of all minimum total reserved capacity parameters for the vDisks in a container should be less than or equal to the minimum total reserved capacity set on the container.

(4) vDisk block size: The vDisk address space is discretized into equal sized blocks. Information about each block is stored, and a configuration parameter determines the size of this block. It should be less than or equal to the stripe width parameter on the container. A relatively large vDisk block size (e.g., 128 KB) helps reduce the metadata that is maintained.

(5) vDisk row blocks: The blocks in a vDisk are conceptually divided into rows. The metadata for each row is kept on one metadata server. This parameter controls how many blocks of this vDisk are in one row.

(6) vDisk Capacity: This is the size (in bytes) of the vDisk address space. This effectively controls the size of disk that an external user VM sees.

(7) QoS parameters: Each vDisk may specify a priority and a fair share. Competing IO requests from various vDisks shall be scheduled based on this priority and fair share.

Figure 1C:
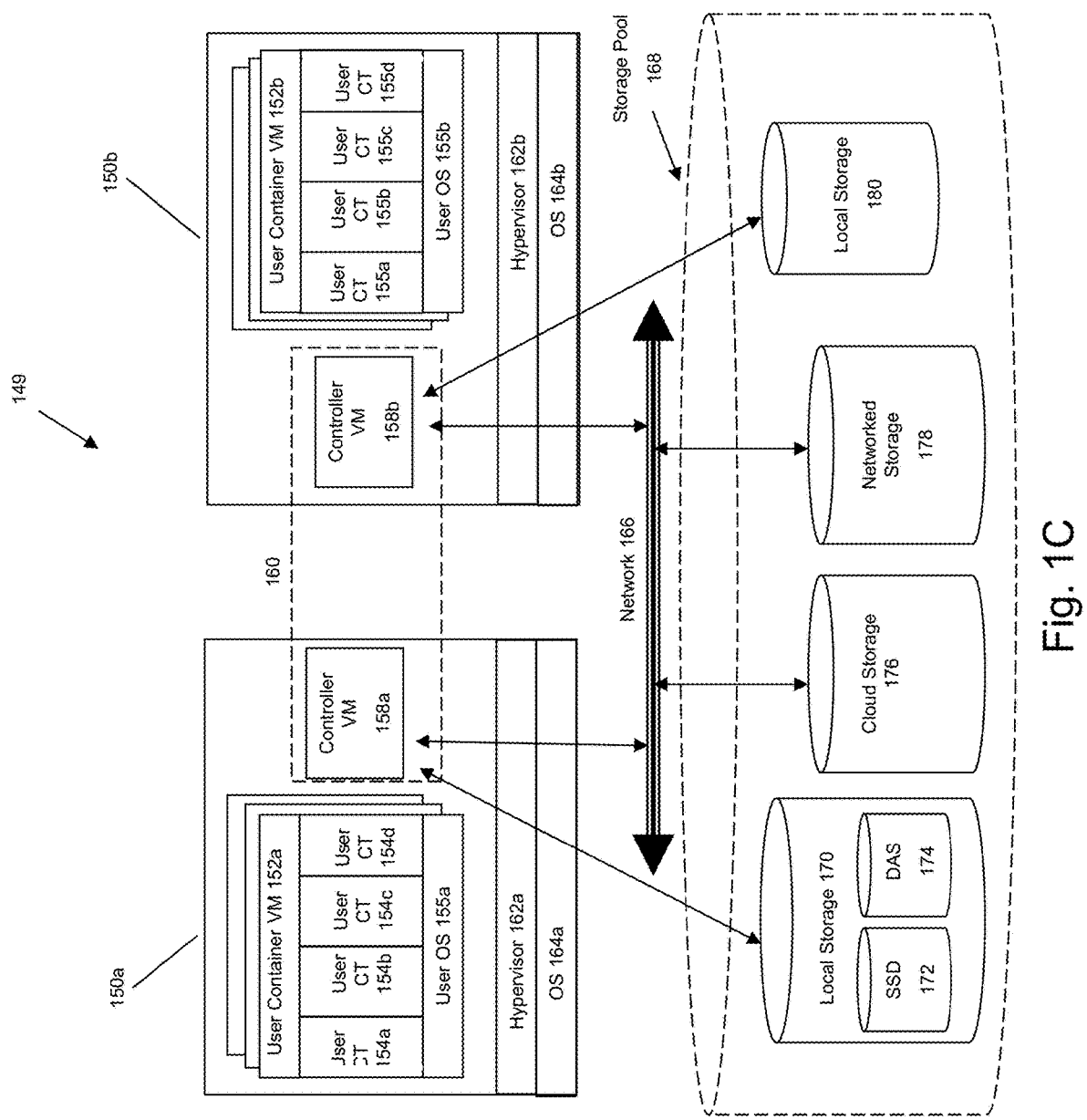

FIG. 1C illustrates an alternative approach for a virtualized computing environment 149 using containers. Generally, containers are a type operating-system level application virtualization, in which the containers run applications in individual execution environments that are isolated from the host operating system and from each other. Some existing systems for running containerized applications include Linux LXC and Docker.

Containers running applications (e.g., containerized applications) have the benefit of being very fast to get up and running because no guest operating system must be installed for the application. The container may interface with the host computer or computers on a network through one or more virtualized network connections, which is managed by a container manager. For example, a web-server container may run web-server application which is addressed by a IP addressed assigned to the container. To address or access the web-server container, a user or computer may use the container IP address, which is intercepted by a container manager (e.g. Docker software/Daemon) and routed to the container. Because the container is isolated from the host operating system, if the container application is compromised (e.g., hacked), the malicious entity doing the hacking will be trapped inside the container, which is isolated and does not have access to other directories in the host. However, to increase security, a containerized system may be implemented within a virtual machine. In this way, containerized applications can be quickly run modified/updated within the container execution environment, and if one or more of the containers or the container management software is breached, it will not affect the physical host computer because the container execution environment is still behind a virtual machine (see user container 152*a-b*, discussed below).

In FIG. 1C, an approach is illustrated for running containers within a distributed storage system, such as the system of 1A. Though FIG. 1C illustrates a particular architecture involving a controller virtual machine and user virtual machine which has user containers, one of ordinary skill in the art appreciates that other configurations may be implemented as well. Other approaches, and configurations are discussed in Nutanix-53-PROV, U.S. Application No. 62/171,990, filed on Jun. 5, 2015, which is hereby incorporated by reference in its entirety.

In FIG. 1C, a distributed platform contains multiple servers 150*a* and 150*b* that manage multiple-tiers of storage. In some embodiments, the servers 150*a* and 150*b* are physical machines with a hardware layer such as memory or processors (not depicted), upon which an operating system may be installed (OS 164*a-b*). The managed multiple tiers of storage include storage that is accessible through a network 166, such as cloud storage 176 or networked storage 178 (e.g., a SAN or "storage area network"). Additionally, the present embodiment also permits local storage 170 and/or 180 that is within or directly attached to the server and/or appliance to be managed as part of a global storage pool 168. Examples of such storage include Solid State Drives (henceforth "SSDs") 172 or Hard Disk Drives (henceforth "HDDs" or "spindle drives") 180 or other types of local storage directly that is directly attached (e.g., direct attached storage, DAS 174). These collected storage devices, both local and networked, form the storage pool 168. Virtual disks (or "vDisks") can be structured from the storage devices in the storage pool 168, as described in more detail below. As used herein, the term vDisk refers to the storage abstraction that is exposed by a controller/service VM to be used by a user VM or a user container (CT). In some embodiments, the vDisk is exposed via iSCSI ("internet small computer system interface") or NFS ("network file system") and is mounted as a virtual disk on the user VM. As discussed, the vDisk may correspond to the global address space which addresses memory portions or extents distributed and shared across multiple storage devices in the pool. Multiple vDisks may reference the same extent, some of which may be located on an SSD 172 or networked storage 178, and all addressable through eh global address space.

Each server 150*a* or 150*b* runs virtualization software, such as VMware ESX(i), Microsoft Hyper-V, or RedHat KVM. The virtualization software includes a hypervisor 162*a-b* to manage the interactions between the underlying hardware and the one or more user CTs that run client software, such as containerized applications.

The servers 150*a-b* may implement virtual machines with an operating system 164*a-b* that supports containers (e.g., Linux) and VM software, such as hypervisors 162*a-b*. In particular, node or server 150*a* runs a controller VM 158*a* and a user container VM 152*a* that runs one or more containers 154*a-d* from a user OS 155*a*. Though only two servers are illustrated, one of ordinary skill in the art appreciates that a plurality of servers may be implemented in the above way.

Each of the user containers may run a container image that may be layered to appear as a single file-system for that container. For example, a base layer may correspond to a Linux Ubuntu image, with an application execution layer on top; the application execution layer corresponding to a read/write execution environment for applications, such as MySQL, webservers, databases or other applications.

In some embodiments, the controller virtual machines 158*a* and 158*b* are used to manage storage and I/O activities for their respective sets of user containers, user containers 154*a-d* and 155*a-d*, respectively. The controller virtualized computer is the "Storage Controller" in the currently described architecture. Multiple such storage controllers coordinate within a cluster to form a single-system 160. The Controller VMs 158*a-b* are not formed as part of specific implementations of respective hypervisors 162*a-b*. Instead, each controller VM runs as a virtual machine above its respective hypervisor 162*a-b* on the various servers 150*a* and 150*b*, and work together to form a distributed system 160 that manages all the storage resources, including the locally attached storage 170/180 the networked storage 178, and the cloud storage 176. As discussed above, other architectures that may be implemented include implementing the storage controllers as containers, thus controller VMs 158*a-b* would be referenced as controller containers, which may be run inside a user container VM 152*a*, a separate VM dedicated to the controller container (e.g. external to user VM 152*a*, but above hypervisor 162*a*), or run directly from the physical host OS 164*a*.

Each controller VM 158*a-b* exports one or more block devices or NFS server targets that appear as disks to the user container VM 152*a-b*. These disks are virtual, since they are implemented by the software running inside the controller VMs 158*a-b*. Thus, to the User-Container VMs 152*a-b*, the controller VMs 158*a-b* appear to be exporting a clustered storage appliance that contains some disks. All user data (including the operating system) in the user-container VMs 152*a-b* resides on these virtual disks. The containers run from within respective user container VMs 152*a-b* may use the user OSs 155*a-b* to run isolated containerized directories. Further, each user OS 155*a-b* may have a container manager installed (e.g., Docker, LXC) to run/manage containers on each respective user container VM 152*a-b*.

Significant performance advantages can be gained by allowing the virtualization system to access and utilize local (e.g., server-internal) storage 170 as disclosed herein. This is because I/O performance is typically much faster when performing access to local storage 170 as compared to performing access to networked storage 178 across a network 166. This faster performance for locally attached storage 170 can be increased even further by using certain types of optimized local storage devices, such as SSDs 172.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 170. On the other hand, data that does not require fast access or which is accessed infrequently can be stored in the networked storage devices 178 or in cloud storage 176. Further details regarding an exemplary approach for implementing the virtualization environment are described in U.S. Pat. No. 8,601,473, which is hereby incorporated by reference in its entirety.

In this way, the security and robustness of a distributed storage system using virtual machines (as illustrated in FIG. 1C) may be combined with efficiency and consistency of a container virtualized computer/application environment.

As noted above, some embodiments can be used to directly implement deduplication when implementing I/O in a virtualization environment. Deduplication refers to the process of making sure that a specific data item is not excessively duplicated multiple times within a storage system. Even if there are multiple users or entities that separately perform operations to store the same data item, the deduplication process will operate to store only a limited number of copies of the data item, but allow those multiple users/entities to jointly access the copies that are actually stored within the storage system.

In some embodiments, the basic unit of deduplication is the extent, which is a contiguous portion of storage on a given storage device. Multiple extents can be collected together and stored within an "extent group." In some embodiments, an extent group corresponds to a single file managed by the underlying file system. Thus, the embodiment would utilize a file system (e.g., a Linux file system) to manage files, where the files correspond to the extent groups to store a set of individual extents. It is noted that while the unit of de-duplication is the extent, the units used for the underlying storage for the extents can be at the granularity of a block. This permits the administration and user access of the data to be a finer level of granularity than the "file" or "extent" level, as described in more detail below. Though, the extent as described above may be a contiguous portion of storage within a given storage device, one of ordinary skill in the art appreciates that the reduced size ID approaches disclosed herein may also be applied to logical storage units, of various sizes (e.g., a logical extent, logical storage unit of n bytes).

Figure 2:
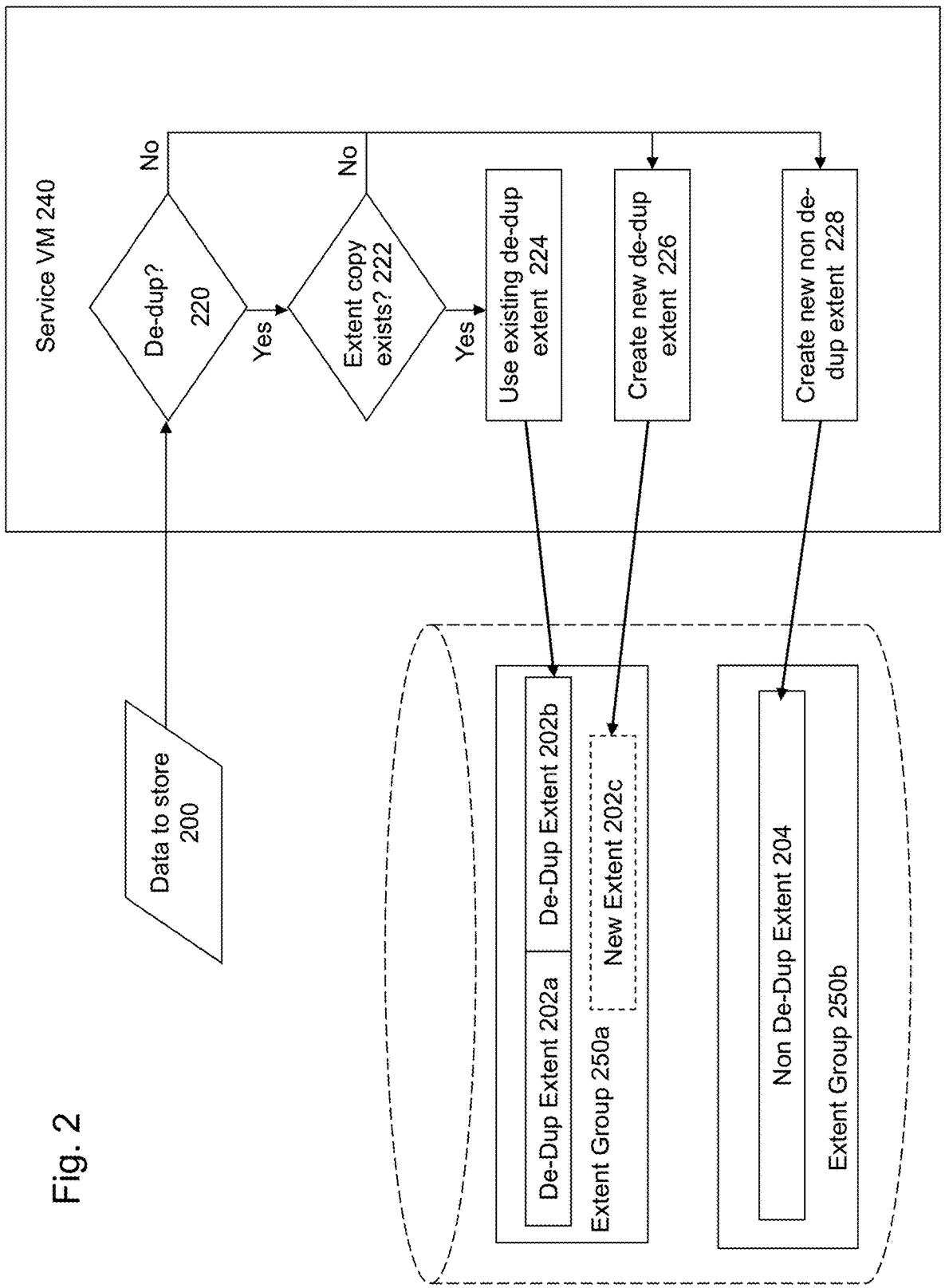
FIG. 2 illustrates a data structure and flow for an approach for implementing de-duplication using reduced size extent identification, according to some embodiments.

The left portion of FIG. 2 illustrates two extent groups 250*a* and 250*b*. Extent group 250*a* includes deduplication with existing deduplicated extents 202*a* and 202*b*. Extent group 250*b* includes a non-deduplicated extent 204. As described in more detail below, new extents (such as extent 202*c*) can be added to an existing extent group, e.g. the extent group 250*a*, if there is sufficient space in the existing extent group.

Assume that a user issues an I/O request to write an item of data 200 to storage. The service VM 240 will perform a process to analyze the data item 200 and assign that data item 200 to an extent for storage. At 220, a determination is made whether deduplication is desired or enabled. If not, then at 228, a new non-de-duplicated extent 204 is created within an appropriate extent group 250*b* to store the data item 200.

If deduplication is enabled, then a further determination is made at 222 whether the storage system already includes a copy of that data item. According to some embodiments, this is accomplished by performing file key analysis upon the data that is being stored. In some embodiments, file key analysis includes performing "Rabin fingerprinting" upon the data to be stored. Rabin fingerprinting is a known algorithm for objectively dividing data into consistent portions. This algorithm creates uniform and common boundaries for data portions that are partitioned out of larger items of data. The SHA1 algorithm is applied to the data portion created by Rabin fingerprinting to create a unique signature or "file key" for that data portion. The SHA1 hashing algorithm that takes any set of arbitrary data and creates a 20-byte content-based signature.

The SHA1 algorithm creates a value that is used as an extent identifier (e.g., file key or "extent ID"), which is further used to determine if an earlier copy of the data item 200 has already been stored in the storage system. If a copy already exists, then a new copy of the data item 200 is not stored; instead, the existing copy stored in dedup extent 202*b* is used. A "ref_count" (or reference count) for that extent 202*b* would be incremented to provide notice that a new entity is now relying upon this extent 202*b* to store the data item 200 as illustrated at 224. However, if a copy of the data item 200 does not yet exist, then a new extent 202*c* is created to store the data item 200.

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations.

Metadata is maintained by the set of Service VMs to track and handle the data, file keys, and storage objects in the system. Each vDisk corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. The Metadata is used to track and maintain the contents of the vDisks and vDisk blocks.

The discretization into vDisk blocks helps store this information in a table in the vDisk map. Thus, given any random offset within the vDisk, one can discretize it obtain the corresponding vDisk block boundary. A lookup can be performed in the vDisk map for that (vDisk, vDisk block) combination. The information in each vDisk block is stored as a separate column in the table. A collection of vDisk blocks might be chosen to be stored in a single row—this guarantees atomic updates to that portion of the table. A table can be maintained for the address space of each vDisk. Each row of this table contains the metadata for a number of vDisk blocks (e.g., in the figure, each row contains information about 6 vDisk blocks). Each column corresponds to one vDisk block. The contents of the column contain a number of extent IDs and the offset at which they start in the vDisk block.

As noted above, a collection of extents is put together into an extent group, which is stored as a file on the physical disks. Within the extent group, the data of each of the extents is placed contiguously along with the data's checksums (e.g., for integrity checks). Each extent group is assigned a unique ID (e.g., 8-byte ID) that is unique to a container. This id is referred to as the extent group ID.

The extent ID map essentially maps an extent to the extent group that it is contained in. The extent ID map forms a separate table within the metadata—one for each container. The name of the table contains the id of the container itself. The lookup key of this table is the canonical representation of an extent ID. In some embodiments, this is either a 16-byte combination containing (vDisk ID, Offset) for non-deduplicated extents, or a 24-byte representation containing (extent size, SHA1 hash) for deduplicated extents. The corresponding row in the table just contains one column—this column contains the extent Group ID where the corresponding extent is contained.

When updates are made to a vDisk address space, the existing extent is replaced by another (in case of de-duplication). Thus the old extent may get orphaned (when it is no longer referred to by any other vDisk in that container). Such extents will ultimately be garbage collected. However, one possible approach is to aggressively reclaim disk space that frees up. Thus, a "ref_count" value can be associated with each extent. When this ref_count drops to 0, then it can be certain that there are no other vDisks that refer this extent and therefore this extent can immediately be deleted. The ref_count on a deduplicated extent may be greater than one when multiple vDisks refer to it. In addition, this may also occur when the same extent is referred to by different parts of the address space of the same vDisk. The ref_count on a non-deduplicated extent may be greater than one when multiple snapshots of a vDisk refer to that extent. One possible approach for implementing snapshots in conjunction with the present invention is described in co-pending U.S. Pat. No. 9,009,106, which is hereby incorporated by reference in its entirety.

The ref_count on an extent is stored inside the metadata for the extent group in the extent Group ID map rather than in the extent ID map. This allows batch updates to be made to several extents and to allow updates to a single extent Group ID metadata entry.

To reduce the number of metadata lookups, an optimization can be made for the case of non-deduplicated extents that have a ref_count of one and are owned solely by the vDisk in question. In such a case, the extent ID map does not have an entry for such extents. Instead, the extent Group ID that they belong to is put in the vDisk address space map itself in the same entry where information about the corresponding vDisk block is put.

The extent Group ID map provides a mapping from an extent Group ID to the location of the replicas of that extent Group ID and also their current state. This map is maintained as a separate table per container, and is looked up with the extent Group ID as the key. The corresponding row in the table contains as many columns as the number of replicas. Each column is referenced by the unique global disk ID corresponding to the disk where that replica is placed. In some embodiments, disk IDs in the server/appliance are assigned once when the disks are prepared. After that, the disk ids are never changed. New or re-formatted disks are always given a new disk ID. The mapping from disk IDs to the servers where they reside is maintained in memory and is periodically refreshed.

An extra column can also be provided for the vDisk ID that created this extent group. This is used to enforce the property that only one vDisk ever writes to an extent group. Thus, there is never a race where multiple vDisks are trying to update the same extent group. In some embodiments, for each replica, some or all of the following information features are maintained.

(a) The diskID where the replica resides.

(b) A Version number.

(c) A Latest Intent Sequence number. This is used for maintaining metadata consistency and is explained later in the subsequent sections.

(d) The extent ids of each of the extents contained in the extent group. This is either the 8 byte offset for non-dedup extents, or 24 bytes (size, SHA1) for dedup extents. For each extent, the offset in the extentGroupID file is also contained here. Additionally, a 4-byte ref_count is also stored for each extent. Finally, an overall checksum is stored for each extent. This checksum is written after a write finishes and is primarily used by a disk scrubber to verify the integrity of the extent group data.

(e) Information about all the tentative updates outstanding on the replica. Each tentative update carries an Intent Sequence number. It also carries the tentative version that the replica will move to if the update succeeds.

If multiple replicas share the same information, then that information will not be duplicated across the replicas. This cuts down unnecessary metadata bloat in the common case when all the replicas are the same.

At any time, multiple components in the appliance may be accessing and modifying the same metadata. Moreover, multiple related pieces of the metadata might need to be modified together. While these needs can be addressed by using a centralized lock manager and transactions, there are significant performance reasons not to use these lock-based approaches. One reason is because this type of central locking negatively affects performance since all access to metadata would need to go through the centralized lock manager. In addition, the lock manager itself would need to be made fault tolerant, which significantly complicates the design and also hurts performance. Moreover, when a component that holds a lock dies, recovering that lock becomes non-trivial. One may use a timeout, but this may result in unnecessary delays and also timing related races.

Figure 3:
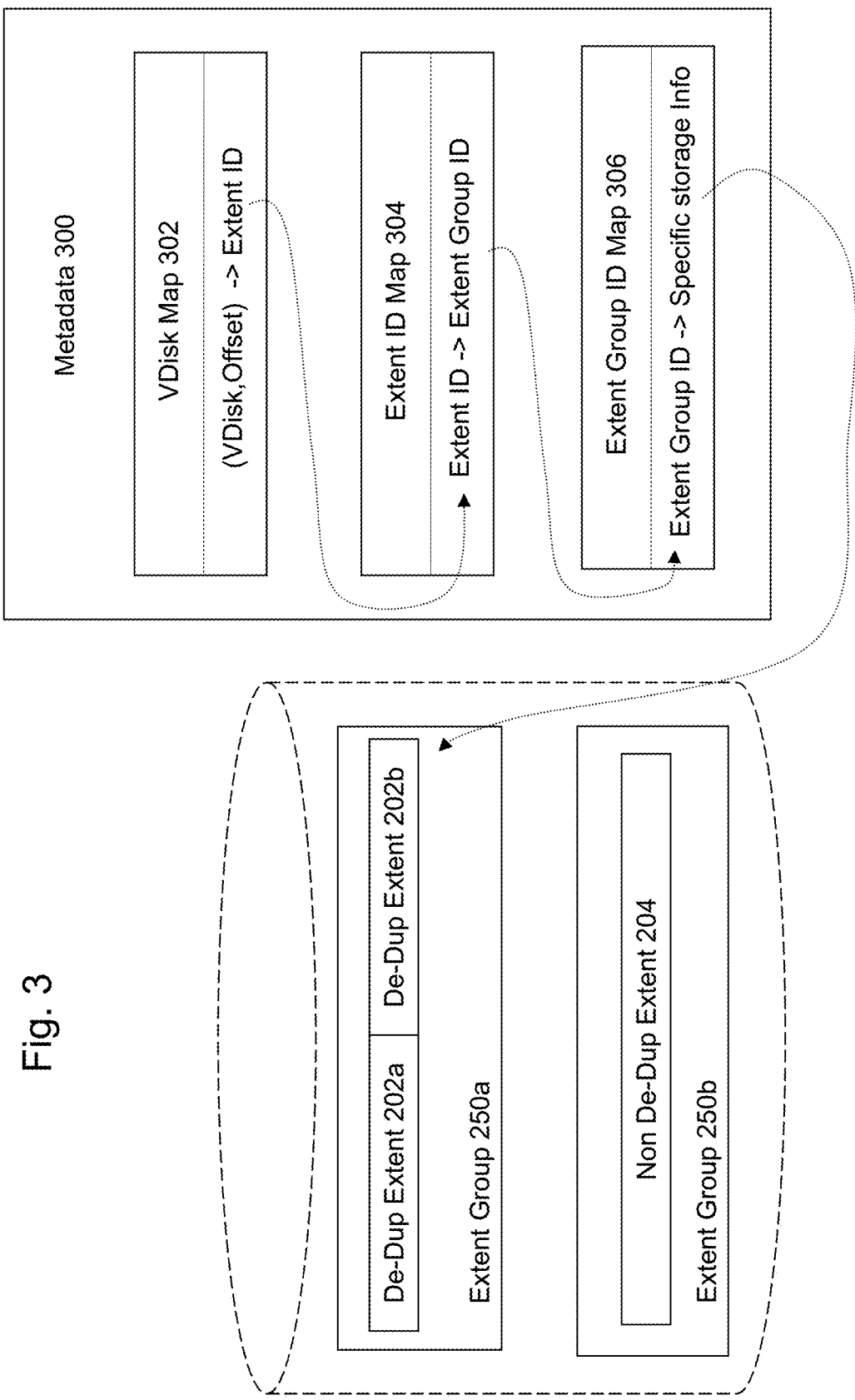
FIG. 3 illustrates a metadata structure and flow for an approach for implementing reduced size extent identification, as according to some embodiments.

As illustrated in FIG. 3, embodiments of the invention maintain three mapping structures as the metadata 300 to track the stored data. A first metadata structure (vDisk map 302) is used to map the vDisk address space for the stored extents. Given a specified vDisk and offset, the vDisk map 302 can be used to identify a corresponding extent ID. A second metadata structure (extent ID map 304) is used to map extent IDs. Given a specified extent ID, the extent ID map 304 can be used to identify a corresponding extent group. A third metadata structure (extent group ID map 306) is used to map specific storage information for extent group IDs. Given a specified extent group ID, the extent group ID map 306 can be used to identify corresponding information, such as for example, (1) disk identifier for the extent group, (2) list of extent IDs in that extent group, (3) information about the extents such as ref counts, checksums, and offset locations.

The vDisk map expects the I/O request to identify a specific vDisk and an offset within that vDisk. In the present embodiment, the unit of storage is the block, whereas the unit of deduplication is the extent. Therefore, the vDisk map is basically assuming the unit of storage specified by the offset information is to a block, and then identifying the corresponding extent ID from that block, where the extent offset can be derived for within the block.

Figure 4:
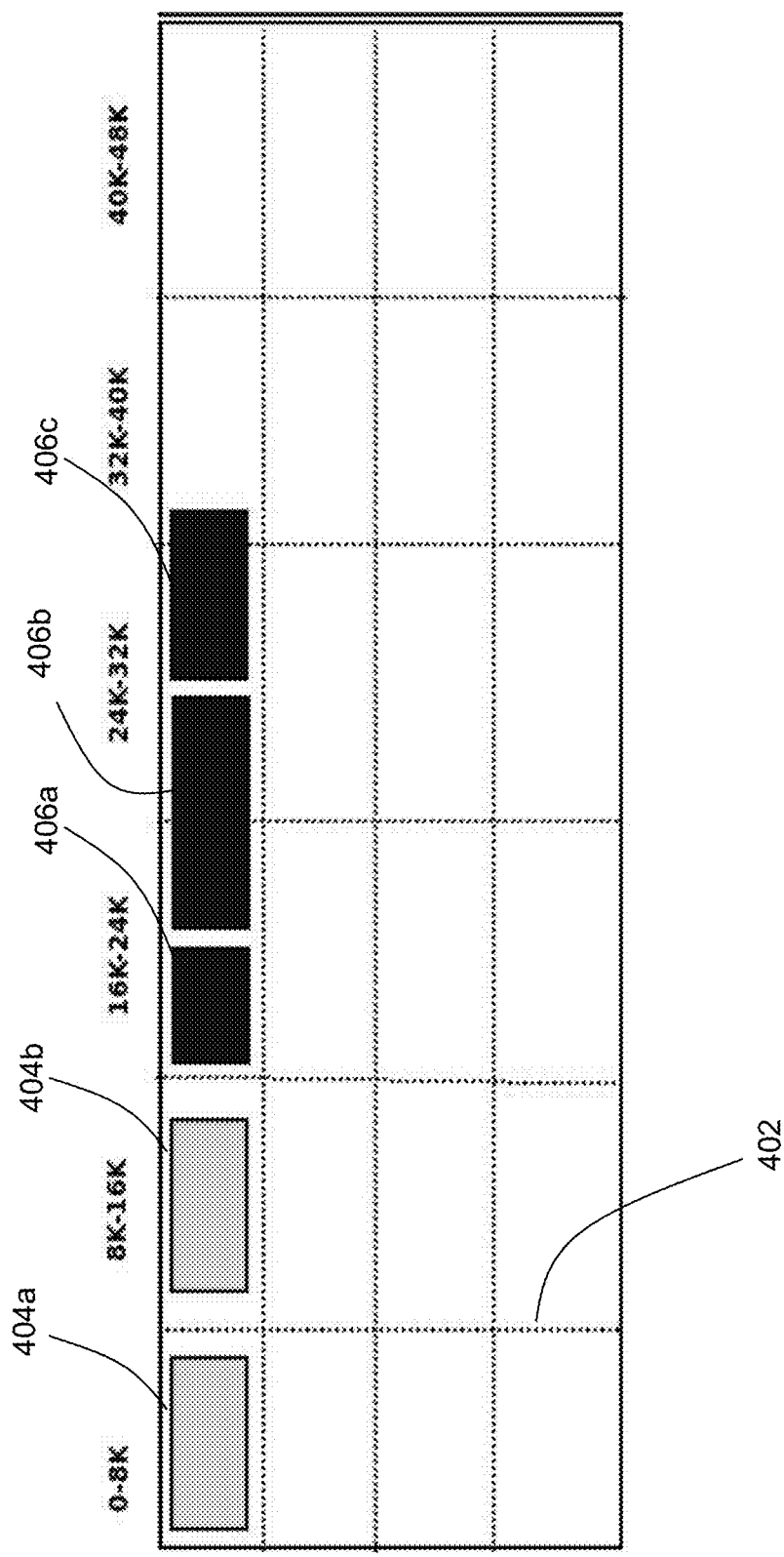
FIG. 4 illustrates a global pool address space comprising extents, according to some embodiments.

FIG. 4 illustrates the address space of a vDisk according to some embodiments. The boxes 402 with dotted boundaries indicate the vDisk blocks which are all of equal size (e.g., 8 KB in this example). The solid boxes 404a-b indicate actual extents. As noted above, extents may be of two types—ones that are used during de-duplication and ones that are not. The ones that are not used during de-duplication have the same size as that of a vDisk block—the corresponding vDisk block contains exactly one of these extents (extents 404a and 404b in the figure). However, when an extent is used for deduplication, such an extent might be of a variable size. Such extents are shown as extents 406a-c in the figure. Since these extents may not align with vDisk block boundaries, it is possible that such a vDisk block may contain more than one such extent.

The non-deduplicated extents 404a-b are owned by the vDisk and can typically be updated in place. In some embodiments, they become copy-on-write only when snapshots are taken. Further, in some embodiments, the de-duplicated extents 406a-c are never updated in place.

Figure 5:
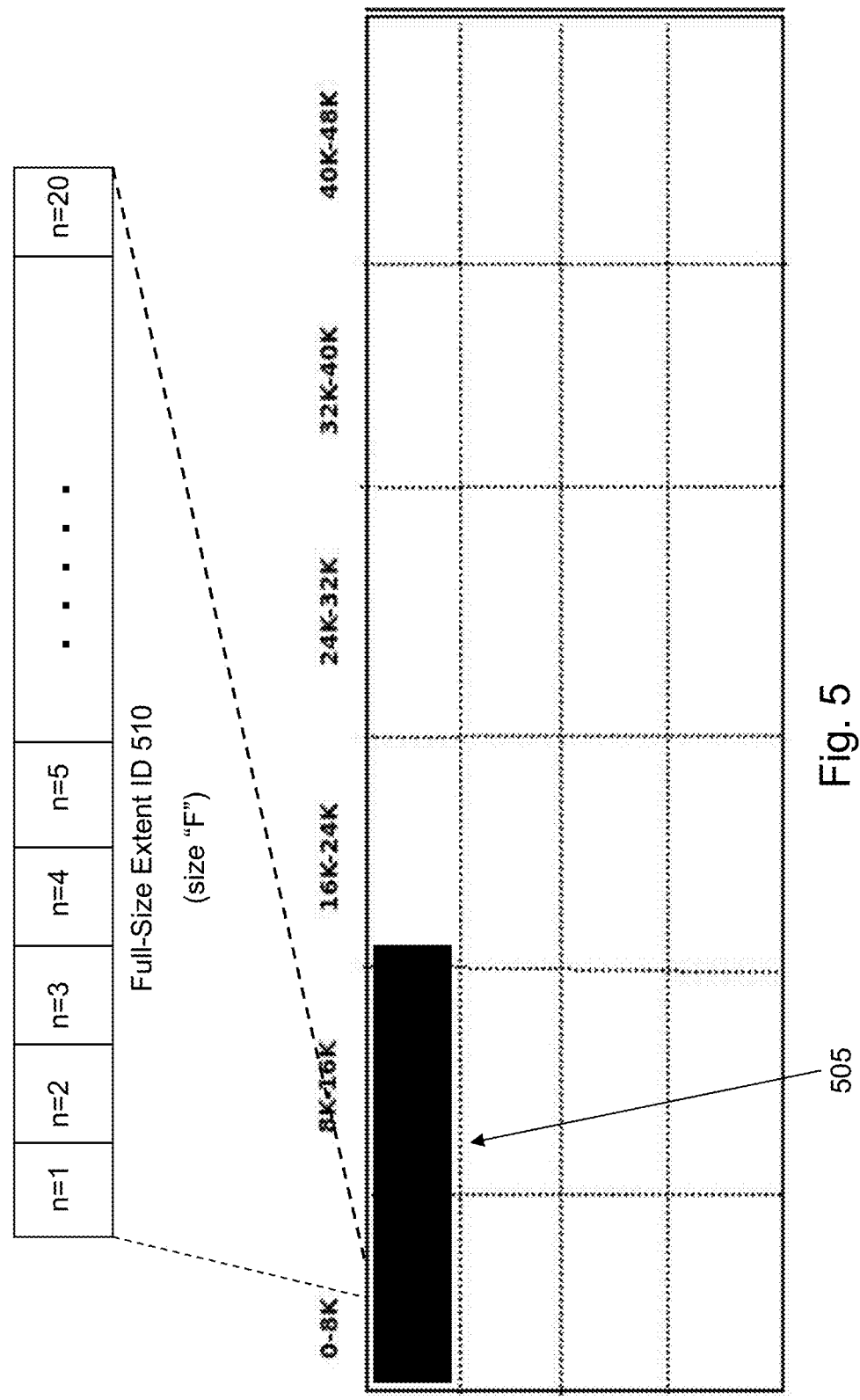
FIG. 5 illustrates a global pool address space comprising an extent and an extent identifier, according to some embodiments.

FIG. 5 illustrates an address space and an individual extent 505 with its corresponding full-size extent ID 510 (e.g., full file size key). As explained above, a hashing algorithm, such as the SHA1 hashing algorithm, can receive a set of arbitrary data (e.g., extent 505) and create a unique 20-byte content-based signature (e.g., a "full-size" ID). Although the example embodiment illustrated in FIG. 5 implements a single de-duplicated extent 505 with a 20-byte file key generated via SHA1, one of ordinary skill in the art appreciates that any type of computer file and any scheme or algorithm for generating hashes may be implemented to create keys.

As illustrated, full-size extent ID 510 corresponds to a data value 20-bytes long, which may be used as a unique identifier in a file system, such as the distributed file system illustrated in FIG. 1A. Although the 20-byte full-size extent ID 510 saves space as it is typically much smaller in size than extent 505, when implemented in large enterprise network, distributed, or clustered environments, the amount of space required just to store and manage the extent IDs keys can be costly.

Figure 6:
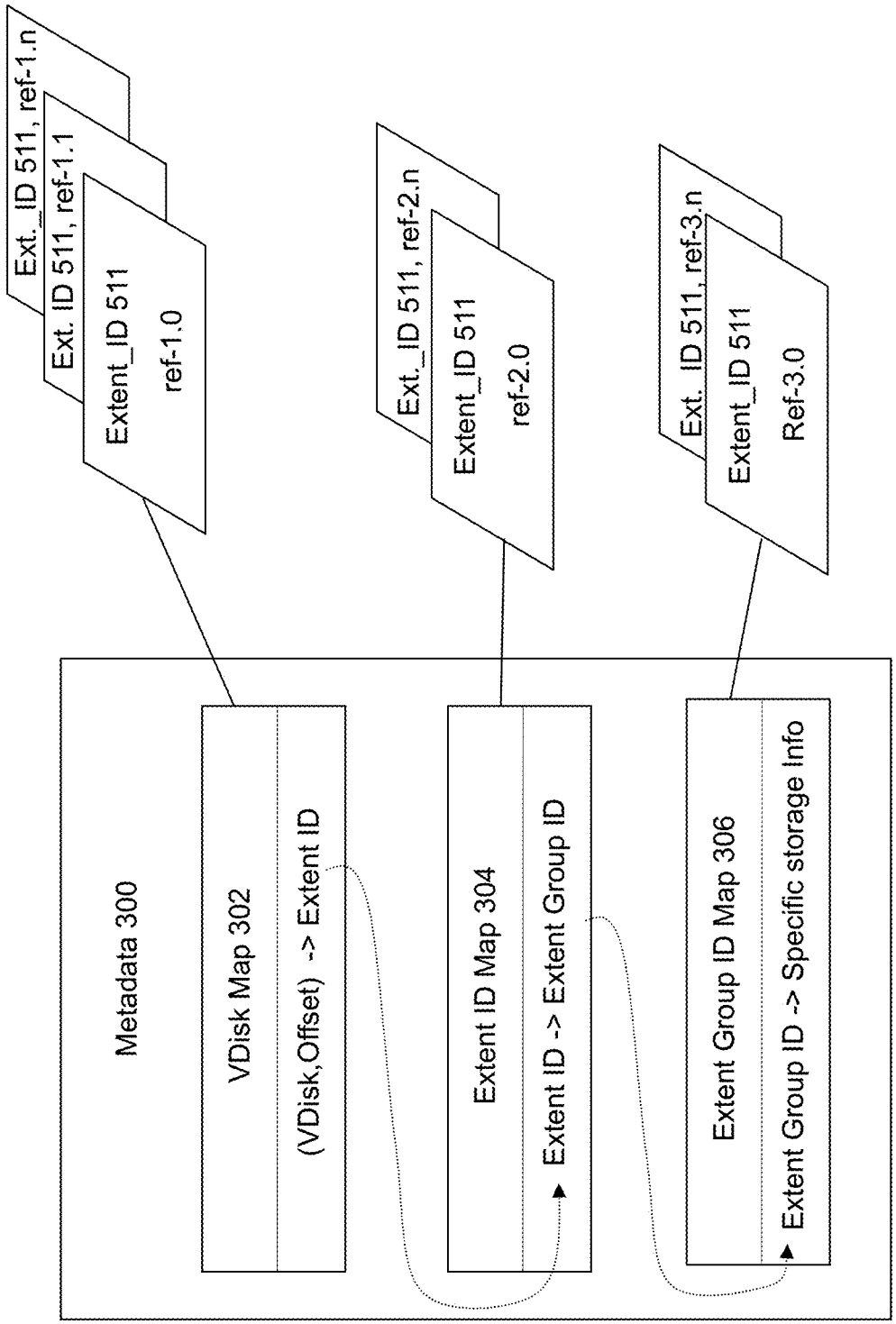
FIG. 6 illustrates a flow and data structure having multiple metadata layers that store keys, according to some embodiments.

FIG. 6 illustrates multiple levels of metadata storing multiple keys. There, the metadata structure 300 comprises the several metadata layers discussed above (e.g., vDisk Map 302, Extent ID Map 304, and Extent Group ID Map 306). In some embodiments, a write request may be received, and extent ID may be generated using a hash scheme to create Extent ID 511. In systems where de-duplication is enabled, multiple user virtual machines may share a single extent which may be referenced by several vDisks that correspond to respective multiple user virtual machines.

In some embodiments, each virtual disk that corresponds to a different perspective user virtual machine stores or references a copy of the Extent ID 511. As such, Extent ID 511 ref-1 may correspond to a first user virtual machine's vDisk, Extent ID 511 ref-1.1 may correspond to a second user virtual machine's vDisk, and Extent ID 511 ref-1.$n$ may correspond to the nth user virtual machine's vDisk. Thus, one 20-byte file identifier can be replicated out n-number of times for each user vDisk, thereby requiring n×20-bytes to store the extent copies in a single metadata layer. At the second metadata level extend ID map 304, the extent ID 511 may again be stored one or more times as Extent ID 511 ref-2.0 to Extent ID 511 ref-2.$n$ (n number of times, as per that level in some embodiments). Finally, at the third metadata level extent group ID map 306, the extent ID 511 may again be stored one or more times as Extent ID 511 ref-3.0 to Extent ID 511 ref-3.$n$ (n number of times, as per that level in some embodiments). Further, in some embodiments using backup replications, the extent ID's for each level may be replicated to different nodes or backup points (e.g., five node cluster backup replication), thereby multiplying the amount of space required to track extent IDs further.

For use in the examples below, as well as in some embodiments, the size of a full-size extent ID may be referenced as data value "F". For example, for the SHA1 algorithm which generates a 20-byte key, "F"=20. A sub-size extent ID has a size value or data value "k" and comprises a portion of "F". In some embodiments, "k" may correspond to the leading sequential values or bytes of "F". For example, if an extent ID generated by SHA1 has "F=20", then "k" may be 4, which is the first four bytes of the 20 bytes. As "F" is designed or configured to be a unique output of a hashing algorithm, "k" may be relatively unique (depending on the total number of files in a file system). In some embodiments, "n" is starting or initial value for a sub-size extent ID of size "k". In some embodiments, the initial value, "n", may be incremented as the likelihood for collision occurs (for example, in very large file systems).

FIG. 7A is a flowchart for an approach for reduced file key size management, as according to some embodiments. At 702, an input output (I/O) request is received. In some embodiments, when an I/O request such as a write request for a piece of data such as an extent is received, a hashing algorithm generates the full-size extent ID of a first file size. As described above, the sub-size extent ID may then be generated by identifying the full-size ID and generating the sub-size extent ID from a portion of the full-size ID. Thus, the sub-size extent ID file size is smaller than that of the full-size extent ID. In some embodiments the leading sequential portion of the full-size ID is used to generate the sub-size extent ID, while in some embodiments different portions of the full-size extent ID (e.g., the middle, end, or pieces or sequences of an ID) are used to generate the sub-size extent ID.

At 704, a determination is made whether a sub-size extent ID having a size value of k=n is unique within the file system, where "n" is the initial or starting value for the sub-size extent ID size. In some embodiments, the uniqueness determination is performed by checking whether any other extents within the file system have corresponding extent IDs of size k=n that match the extent ID generated at 702.

If the sub-size extent ID of size "k=n" for the extent ID generated at 702 is unique, then at 708 the sub-size extent ID key of size "k=n" may be used in place of the full-size extent ID of size "F" as a primary identifier for the extent throughout the file system. Additionally, the sub-size extent ID of size "k=n" may also be to reference the extent in the other one or more levels of metadata and as well as in internally in other nodes. As such, when the sub-size extent ID of "k=n" is found to be unique, the extent is stored in the computer readable medium at 708 (such as the storage devices illustrated in FIG. 1A and FIG. 3). Further, at 710 the reduced sub-size extent ID may be updated in metadata as a reference or identifier for the extent.

In some embodiments, the metadata may still store the full-size extent ID for later consultation or reference, such as to resolve collisions and matches with other old or new extent IDs. For example, with reference to FIG. 6, the full-size extent ID may be stored or updated as Extent ID 511 ref-1.0, while the reduce extent ID may be stored or updated as the Extent ID 511 ref-2.0 and extent ID ref-3.0 in the other metadata layers. Similarly, other references within the same metadata layer may use the reduced identifier; for example, the full-size extent ID may be stored as Extent ID 511 ref-1.0 and Extent ID 511 ref-1.1 through Extent 511 ref1.*n* may all use or store the reduced size extent ID. Further, in some embodiments, through-out all the metadata layers only the sub-size extent ID may be stored. In those embodiments, a data structure mapping full-size extent ID to sub-size extent IDs may be kept in additional metadata layers. In some embodiments, the mapping for the full-size extent ID to sub-size extent ID is stored as a separate data structure, external to the metadata structure 300.

Referring back to FIG. 7A at 704, in the case where the sub-size extent ID key of size "k=n" is not unique within the file system, then at 706 "k" may be incremented by one or more units in a loop (e.g., "n=n+1"). For example, if the sub-size extent ID having "k=4" is not unique within the file system, then at 706 the value of "k" is increased to "5", which may correspond to the first five bytes of the full-size unique key "F".

Then the process may return to 704, where the uniqueness determination be performed again to determine whether the incremented sub-size extent ID key of "k=5" is unique. If the sub-size extent ID of size "k=5" is unique, then at 708 the extent is stored within the computer readable medium and at 710 the metadata is updated with the sub-size extent ID of "k=5" as explained above.

The process of increasing the value of "k" for a given sub-size extent ID at 706 may continue to increase until a unique "k" value is found for the sub-size extent identifier. As hashing algorithms are generally designed to ensure that "F" is unique, "k" may be increased up to "F", with the assurance that "F" is unique within the file system and eventually a key will be identified for the extent. In some embodiments, if "k" is increased one or more times, in the next increase cycle, the value of "k" may simply be increased to "F" to save computational resources where continually increasing "k" and checking for uniqueness becomes a computational burden. For example, if "k=4" is not unique, and "k=5" is also found to be unique, to save time and resources the file system may simple increase to "k=20". In some embodiments, the size of sub-size extent ID is increased incrementally (e.g., k=4, k=5, k=6, etc.), while in some embodiments the size of sub-size extent ID is increased in steps (e.g., k=2, k=7, k=15).

Figure 7B:
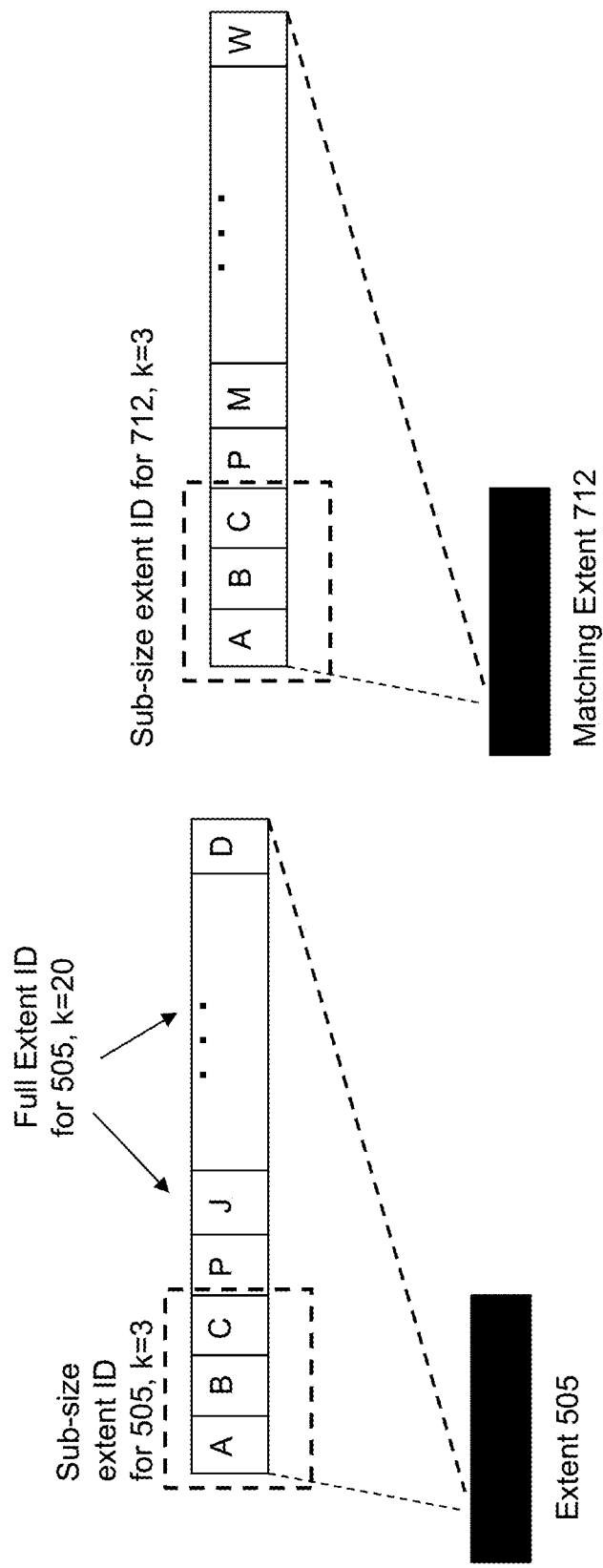
FIG. 7B-D illustrates sub-size extent ID matching and storing, according to some embodiments.
Figure 7C:
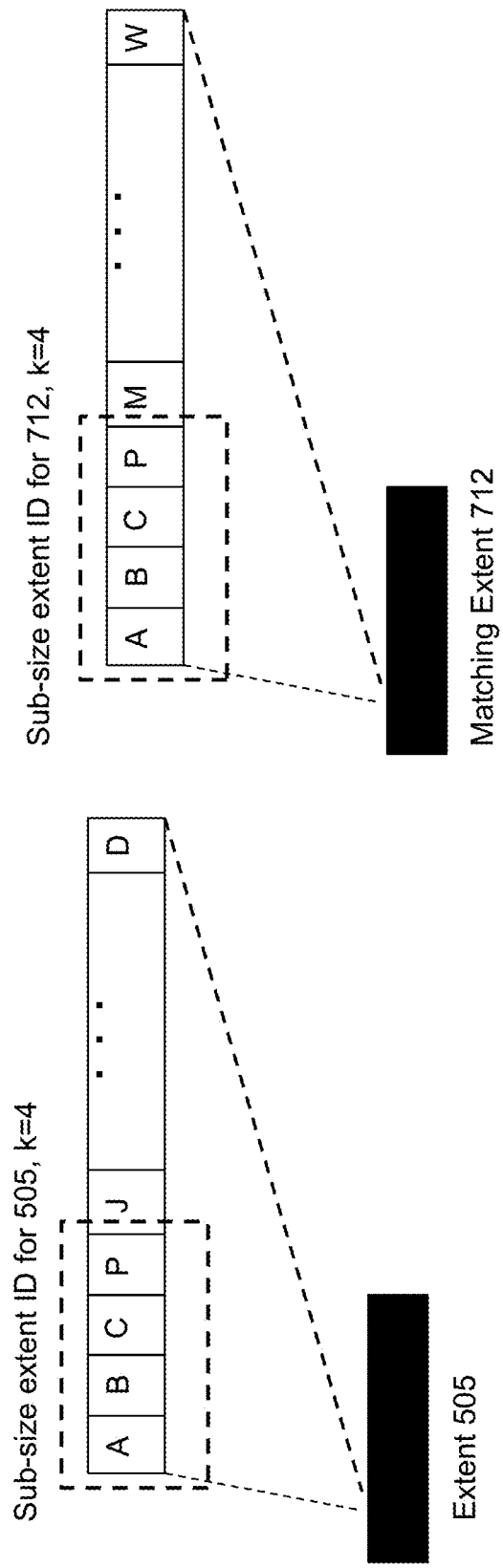
Figure 7D:
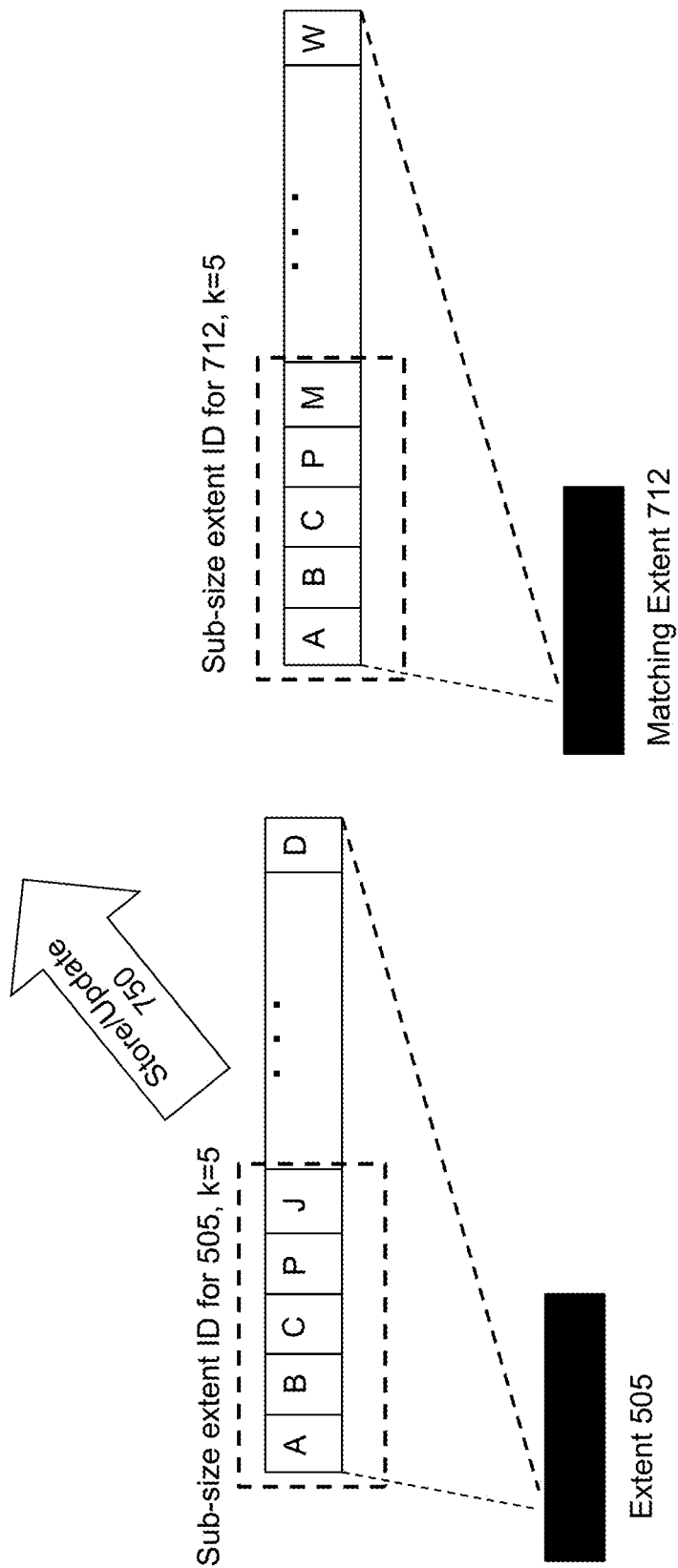

FIG. 7B-D illustrates an example of the flow of FIG. 7A. In FIG. 7B, a write request for extent 505 is received. SHA1 may then be used to generated a full-size extent ID for extent 505 having 20-bytes (e.g., with a first value of "A", a second value of "B" . . . and a last value of "D"). The sub-size extent ID for 505 may then be generated from the first three bytes of the full-size extent ID. As illustrated in FIG. 7B, the first three values "A, B, C" are used as the sub-size extent ID of "k=3". Then there may be a determination whether the extent "A, B, C" is unique with in the file system. It is determined that an extent stored in the file system, extent 712, has a sub-size extent ID of size "k=3" that exactly matches the sub-size extent ID initially generated for extent 505.

Referring to FIG. 7C, the sub-size extent ID for extent 505 may then have its size increased from "k=3" to "k=4". Thus, as illustrated, the new increased size of "k=4" for extent 505 is "A, B, C, P", which is compared against the sub-size extent ID of "k=4" for extent 712. Again, the two sub-sizes extent ID's match as they both have values of "A, B, C, P". As such, the sub-size extent ID for extent 505 may again be incremented.

FIG. 7D illustrates incrementing the sub-size extent ID for extent 505 to "k=5", which has a value of "A, B, C, P, J". This value is then compared against the sub-size extent ID for extent 712 and it is determined that the sub-size extent ID for extent 505 to "k=5" is unique as the 5th value of the respective sub-size ID's is different ("J" for extent 505, and "M" for extent 712").

After the sub-size extent ID for extent 505 is found (here at k=5), the extent 505 may be stored in the file system, such as the distributed file system illustrated in FIG. 1A. Further, the sub-size extent ID for extent 505 with a size of "k=5" may be stored or updated in metadata 300 as illustrated in FIG. 7D at 750.

FIG. 8A illustrates a flow for an approach for reduced size key management in a file system using deduplication and/or pointers, as according to some embodiments. At 800 an I/O is received for an extent. At 802 the full-size extent ID is generated using a hashing algorithm or unique key generator. At 804, the sub-size extent ID of an initial size is generated from the full-size extent ID. At 806, a determination is made whether the sub-size extent ID of the initial size is unique within the file system. If the sub-size key of the initial size is unique the sub-size extent ID may be stored or updated and the corresponding extent stored in the file system.

However, if the sub-size extent ID of the initial size is not unique, then another determination may occur. In some embodiments, if there is a sub-size extent ID match it may be that the match corresponds to an extent that is different than extent to be stored. For example, in FIG. 7C, it initially appears that extent 505 and extent 712 are the same piece of data since they have sub-size extent ID's that have identical first bytes. However, as evidenced by their full-size extent IDs they are different non-matching pieces of data; the hash for extent 505 ends in "D", while the hash for extent 712 ends in "W".

In contrast, in some file systems, for example in those where de-duplication is enabled, a match between two sub-size extent IDs may indicate that the extent to be stored already has a matching extent in the file system, thus de-duplication should occur. Referring back to FIG. 8A, in some embodiments, where a match of sub-size extent IDs occurs at 808 a determination may occur comparing the full extent ID of the extent to be stored and the full size extent ID of the extent already stored in the file system. If the two full-size extent IDs match, then the extent to be stored has an identical extent already stored in the file system. Accordingly, as illustrated at 810, instead of storing the extent a pointer or reference is made using the extent ID already stored in the file system. In this way, extents may be deduplicated as discussed above in reference to FIG. 2.

However, if at 808, it is determined that the two full-size extent IDs are not a match, then the size of the sub-size extent ID may be increased at 812. In some embodiments, the increasing at 812 may be a looped process (as illustrated in FIG. 7A). While in other embodiments, the two full-size extent ID's may be analyzed to similarities. For example, there may be a similarities comparison that determines for which "k" value the sub-size value of the extent to be stored will be unique. Once a unique sub-size extent ID is found, then at 812 the metadata may be updated with sub-size extent ID of the increased size, and the extent be stored in the file system.

Figure 8B:
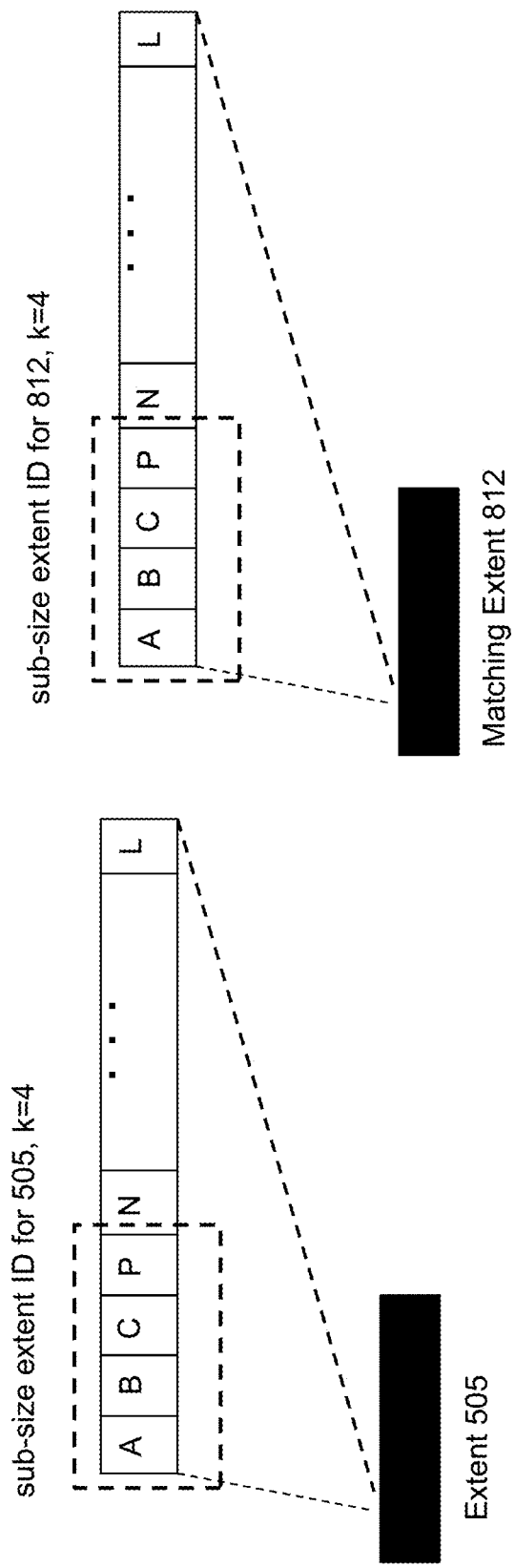
FIG. 8B-D illustrate matching and storing sub-size extent IDs, according to some embodiments.
Figure 8C:
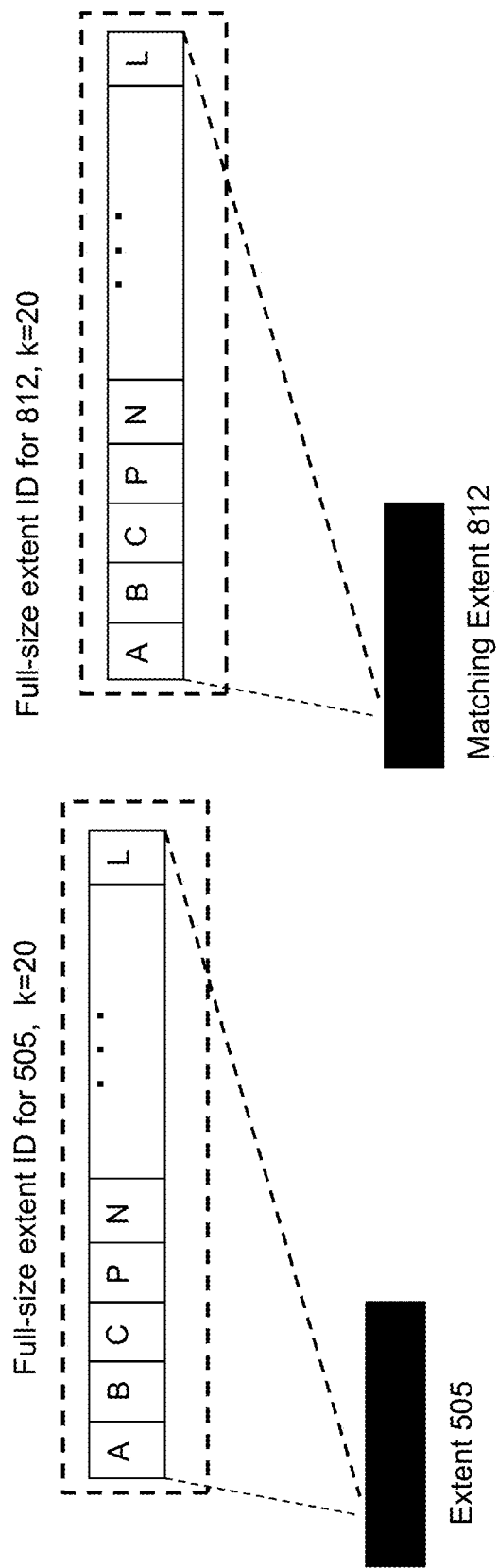
Figure 8D:
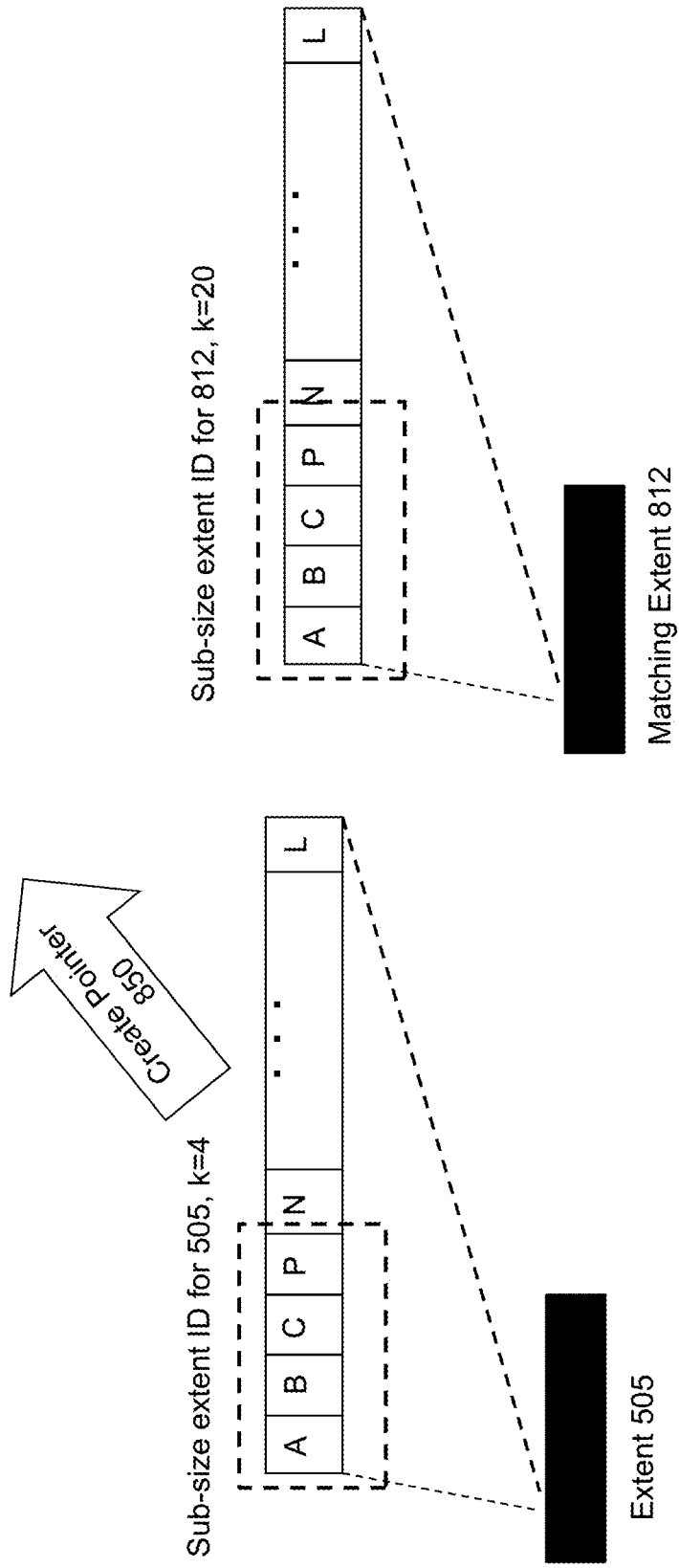

FIGS. 8B-D illustrate an example of the flow illustrated in FIG. 8A. In FIG. 8A extent 505 has a sub-size extent ID of size "k=4" and a value of "A, B, C, P". After a uniqueness determination, matching extent 812 with a sub-size extent id of size "k=4" having a value of "A, B, C, P" is identified. In FIG. 8C, both full-size extent IDs for the respective extents are compared and it is determined the full-size extent IDs match; thus extent 505 is identical to 812. In FIG. 8D, extent 505 is not stored and instead a pointer is created which points to the matching extent 812.

Figure 9:
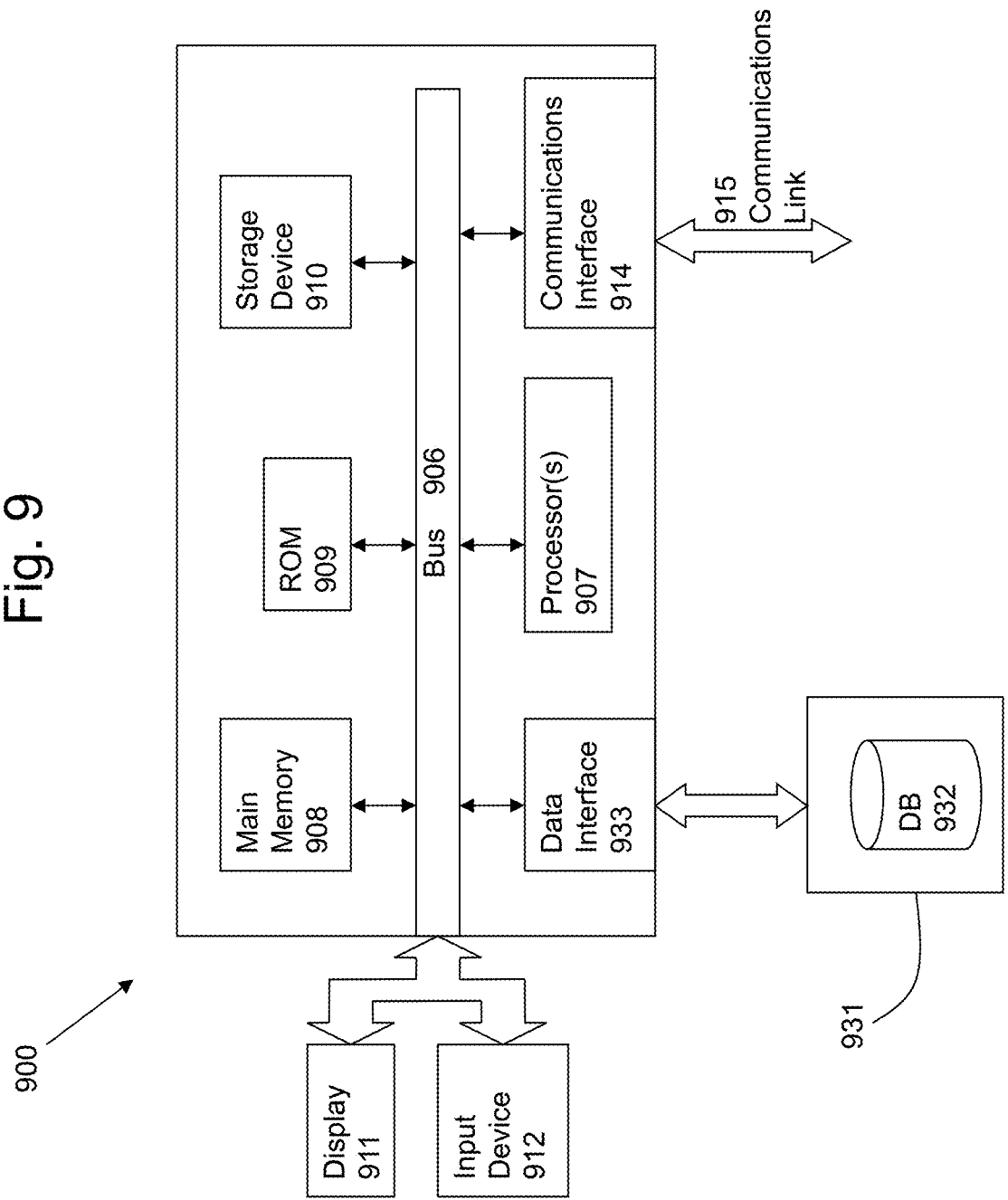
FIG. 9 illustrates example system architecture, according to some embodiments.

FIG. 9 is a block diagram of an illustrative computing system 900 suitable for implementing an embodiment of the present invention for performing intrusion detection. Computer system 900 includes a bus 906 or other communication mechanism for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 1012 (e.g., keyboard), and cursor control. A database 932 may be accessed in a storage medium using a data interface 933.

According to one embodiment of the invention, computer system 900 performs specific operations by processor 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some embodiments, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method comprising:
   identifying a full-size identifier for an extent, the extent being stored in a file system;
   generating a sub-size identifier from a sequential portion of the full-size identifier, the sub-size identifier being smaller than the full-size identifier, both the full-size identifier and the sub-size identifier uniquely identifying the extent within the file system, wherein the sub-size identifier has an initial size and a size of the sub-size identifier is increased from the initial size until the sub-size identifier is unique within the file system; and
   storing the sub-size identifier to reference the extent in place of the full-size identifier.

2. The computer-implemented method of claim 1, further comprising:
   determining whether the sub-size identifier is unique in the file system and increasing the size if the sub-size identifier is not unique in the file system.

3. The computer-implemented method of claim 1, wherein the full-size identifier is unique within the file system.

4. The computer-implemented method of claim 1, wherein the sub-size identifier is generated from a leading sequential portion of the full-size identifier.

5. The computer-implemented method of claim 1, wherein the sub-size identifier is stored as a primary identifier for the extent within the file system.

6. The computer-implemented method of claim 1, further comprising receiving a write request for the extent and deduplicating the extent in the file system using the sub-size identifier.

7. The computer-implemented method of claim 1, wherein the extent is deduplicated in a process comprising comparing the full-size identifier to other full-size identifiers in the file system.

8. The computer-implemented method of claim 1, wherein the size of the sub-size identifier is repeatedly increased.

9. A system comprising:
   a file system;
   a computer processor to execute a set of instructions;

a memory to hold the set of instructions, in which the set of instructions, when executed by the computer processor cause a set of acts comprising:

identifying a full-size identifier for an extent, the extent being stored in a file system;

generating a sub-size identifier from a sequential portion of the full-size identifier, the sub-size identifier being smaller than the full-size identifier, both the full-size identifier and the sub-size identifier uniquely identifying the extent within the file system, wherein the sub-size identifier has an initial size and a size of the sub-size identifier is increased from the initial size until the sub-size identifier is unique within the file system; and storing the sub-size identifier to reference the extent in place of the full-size identifier.

10. The system of claim 9, wherein the set of acts further comprise determining whether the sub-size identifier is unique in the file system and increasing the size if the sub-size identifier is not unique in the file system.

11. The system of claim 9, wherein the full-size identifier is unique within the file system.

12. The system of claim 9, wherein the sub-size identifier is generated from a leading sequential portion of the full-size identifier.

13. The system of claim 9, wherein the set of acts further comprise storing the sub-size identifier as a primary identifier for the extent within the file system.

14. The system of claim 9, wherein the set of acts further processing a write request for the extent and deduplicating the extent in the file system.

15. The system of claim 9, wherein the set of acts further comprise deduplicating the extent in a process comprising comparing the full-size identifier to other full-size identifiers in the file system.

16. The system of claim 9, wherein the size of the sub-size identifier is repeatedly increased.

17. A non-transitory computer readable medium having stored thereon a sequence of instructions which, when executed by a processor causes a set of acts comprising:

identifying a full-size identifier for an extent, the extent being stored in a file system;

generating a sub-size identifier from a sequential portion of the full-size identifier, the sub-size identifier being smaller than the full-size identifier, both the full-size identifier and the sub-size identifier uniquely identifying the extent within the file system, wherein the sub-size identifier has an initial size and a size of the sub-size identifier is increased from the initial size until the sub-size identifier is unique within the file system; and storing the sub-size identifier to reference the extent in place of the full-size identifier.

18. The non-transitory computer readable medium of claim 17, wherein the set of acts further comprise determining whether the sub-size identifier is unique in the file system and increasing the size if the sub-size identifier is not unique in the file system.

19. The non-transitory computer readable medium of claim 17, wherein the full-size identifier is unique within the file system.

20. The non-transitory computer readable medium of claim 17, wherein the sub-size identifier is generated from a leading sequential portion of the full-size identifier.

21. The non-transitory computer readable medium of claim 17, wherein the set of acts further comprise storing the sub-size identifier as a primary identifier for the extent within the file system.

22. The non-transitory computer readable medium of claim 17, wherein the set of acts further comprise processing a write request for the extent and deduplicating the extent in the file system.

23. The non-transitory computer readable medium of claim 17, wherein the set of acts further comprise deduplicating the extent in a process comprising comparing the full-size identifier to other full-size identifiers in the file system.

24. The non-transitory computer readable medium of claim 22, wherein the size of the sub-size identifier is repeatedly increased.

* * * * *